(12) United States Patent
Mann

(10) Patent No.: US 10,465,831 B2
(45) Date of Patent: Nov. 5, 2019

(54) FLUID LINE

(71) Applicant: Stephan Mann, Biebergemuend (DE)

(72) Inventor: Stephan Mann, Biebergemuend (DE)

(73) Assignee: NORMA GERMANY GMBH, Maintal (DE)

(*) Notice: Subject to any disclaimer, the term of this patent is extended or adjusted under 35 U.S.C. 154(b) by 67 days.

(21) Appl. No.: 15/503,218

(22) PCT Filed: Aug. 4, 2015

(86) PCT No.: PCT/EP2015/067978
§ 371 (c)(1),
(2) Date: Feb. 10, 2017

(87) PCT Pub. No.: WO2016/023797
PCT Pub. Date: Feb. 18, 2016

(65) Prior Publication Data
US 2017/0234191 A1     Aug. 17, 2017

(30) Foreign Application Priority Data

Aug. 12, 2014   (DE) .................. 10 2014 111 458

(51) Int. Cl.
*F01N 3/28*     (2006.01)
*F16L 53/38*    (2018.01)
(Continued)

(52) U.S. Cl.
CPC ............ *F16L 53/38* (2018.01); *F01N 3/2882* (2013.01); *F16L 11/10* (2013.01); *F16L 11/12* (2013.01); *F16L 51/00* (2013.01); *F16L 57/00* (2013.01); *F16L 57/02* (2013.01); *F01N 2610/02* (2013.01); *F01N 2610/10* (2013.01); *F01N 2610/14* (2013.01)

(58) Field of Classification Search
CPC ... F16L 53/38; F16L 11/10; F16L 9/12; F16L 9/127
USPC .................. 138/141, 137, 114, 110, 121
See application file for complete search history.

(56) References Cited

U.S. PATENT DOCUMENTS 3,623,513 A * 11/1971 Dinkelkamp ........... F16L 11/14
138/114
3,857,415 A * 12/1974 Morin ..................... F16L 11/112
138/122

(Continued)

FOREIGN PATENT DOCUMENTS

BE          572473        6/1962
CN        102788220      11/2012
(Continued)

OTHER PUBLICATIONS

CN 20122536713 machine English translation.*
(Continued)

*Primary Examiner* — Patrick D Maines
(74) *Attorney, Agent, or Firm* — Greenblum & Bernstein, P.L.C.

(57) ABSTRACT

The invention relates to a fluid line (1) having a tube (2) made of a synthetic material. The fluid line (1) should be guided in a flexible manner. To this end, it is provided that the synthetic material can be subjected to a temperature of at least 150° C., and that along part of the length thereof, the tube (2) is surrounded by an expansion protection (8).

10 Claims, 1 Drawing Sheet

(51) Int. Cl.
*F16L 57/00* (2006.01)
*F16L 57/02* (2006.01)
*F16L 11/10* (2006.01)
*F16L 11/12* (2006.01)
*F16L 51/00* (2006.01)

(56) References Cited

U.S. PATENT DOCUMENTS

| | | | | |
|---|---|---|---|---|
| 4,344,462 | A | * | 8/1982 | Aubert .................... F16L 11/16 138/122 |
| 4,683,917 | A | * | 8/1987 | Bartholomew ........ F16L 11/118 138/109 |
| 4,878,537 | A | * | 11/1989 | Verkaart ................. A61M 5/44 165/156 |
| 5,263,646 | A | * | 11/1993 | McCauley ............ B05B 15/652 239/154 |
| 5,277,227 | A | | 1/1994 | Bradshaw et al. |
| 5,601,582 | A | * | 2/1997 | Shelton ............ A61B 17/32056 604/22 |
| 5,746,255 | A | * | 5/1998 | Walsh ........................ E03B 7/12 138/109 |
| 7,302,972 | B1 | * | 12/2007 | Stowe ..................... F16L 47/20 138/109 |
| 2006/0152006 | A1 | * | 7/2006 | Paquis ................ F16L 25/0045 285/239 |
| 2008/0303277 | A1 | * | 12/2008 | Yamashita ............ F16L 13/007 285/382.5 |
| 2009/0000681 | A1 | | 1/2009 | Averbuch et al. |
| 2013/0320599 | A1 | * | 12/2013 | Kramer, Jr. ............. B29C 49/48 264/523 |

FOREIGN PATENT DOCUMENTS

| | | | | |
|---|---|---|---|---|
| CN | 20122536713 | * | 3/2013 | ............. F01N 3/28 |
| CN | 203686408 | | 7/2014 | |
| DE | 601 29 019 | | 2/2008 | |
| DE | 20 2012 101 676 | | 7/2012 | |
| EP | 2 009 338 | | 12/2008 | |
| JP | 2007-071226 | | 3/2007 | |
| JP | 2011-169467 | | 9/2011 | |
| KR | 10-1998-084042 | | 12/1998 | |
| WO | 99/36684 | | 7/1999 | |
| WO | 2009/109609 | | 9/2009 | |
| WO | 2014/060135 | | 4/2014 | |

OTHER PUBLICATIONS

DE 202012101676 machine English translation.*
International Search Report in PCT/EP2015/067978 (dated Oct. 9, 2015).
German Office Action conducted in counterpart German Appln. No. 10 2014 111 458.2 (dated Jul. 13, 2015) (w/ partial English language translation).
Korea Office Action conducted in counterpart Korea Appln. No. 10-2017-7003542 (dated Jul. 4, 2018) (w/ English translation).
China Office Action conducted in counterpart China Appln. No. 201580043194.6 (dated Dec. 4, 2018).

* cited by examiner

FLUID LINE

The invention is described below with reference to a fluid line which is used to transport a carbamide solution, so-called "urea", from a tank to a consumer location. Urea is used in diesel engines in order to reduce nitrogen oxides.

Urea is injected into the exhaust gas line of a diesel engine. This exhaust gas line has a high temperature. Many plastics materials cannot withstand this temperature so that the urea line has to be guided with a specific spacing with respect to the exhaust gas line. This limits the freedom during guiding of the fluid line.

The object of the invention is to be flexible during guiding of the fluid line.

This object is achieved with a fluid line of the type mentioned in the introduction in that the plastics material can withstand a temperature of at least 150° C. and the pipe is surrounded at least over a portion 10 of the length thereof by an expansion protection member.

The use of a plastics material with the given temperature resistance does prevent the plastics material from becoming damaged by the high temperature in the environment of the exhaust gas line. However, there is produced another problem in that the fluid which is guided in the fluid line evaporates at the high temperatures and there is thereby produced a relatively high vapor pressure which can be significantly greater than 10 bar. Plastics materials which withstand the high temperatures in many cases become soft at these high temperatures and expand. At the relatively high pressures, this expansion may lead to bursting of the pipe. Although the risk of bursting could be prevented by more plastics material being used in the pipe, this has the disadvantage that the pipe acquires a higher level of rigidity and can be harder to process. If an expansion protection member which surrounds the pipe is now used, then an expansion of the pipe is prevented and the risk of the pipe bursting as a result of a high vapor pressure of the fluid, for example, urea, is therefore kept small. The expansion protection member itself does not have to be resistant to the fluid. It is then possible to adapt the material and the construction of the expansion protection member exclusively or at least primarily to the function of preventing expansion of the pipe.

Preferably, the pipe at a predetermined internal pressure which is less than the predetermined limit pressure is in abutment with the expansion protection member at the radially inner side. Ideally, the expansion protection member is always in abutment with the outer periphery of the pipe. However, this would make the assembly of the expansion protection member on the pipe considerably more difficult. A small play is therefore allowed between the outer diameter of the pipe and the inner diameter of the expansion protection member. However, this play is so small that as a result of the expansion of the pipe it disappears even at relatively small internal pressures so that the expansion protection member can reliably prevent further expansion of the pipe at an increased internal pressure. The internal pressure at which the pipe is internally in abutment with the expansion protection member may be, for example, 2, 3, 4 or 5 bar.

Preferably, the expansion protection member has a plurality of support disks which are orientated substantially perpendicularly to the radially outer surface of the pipe. Consequently, the mass of the expansion protection member can be kept small. The support disks may be relatively thin along the longitudinal extent of the pipe. The stability is produced by the disks being orientated substantially perpendicularly to the radially outer surface of the pipe and consequently being able to absorb relatively large forces since the support disks can practically no longer be deformed in this direction as a result of their orientation.

Preferably, the support disks are connected to each other along the longitudinal extent of the pipe. This facilitates the assembly. Furthermore, as a result of the connection, it is possible to ensure in a simple manner that the support disks maintain a predetermined spacing with respect to each other after assembly.

Preferably, the support disks have in the longitudinal extent of the pipe a spacing with respect to each other which corresponds at a maximum to the outer diameter of the pipe. Between the support disks, the pipe is not supported radially outward or is supported to a lesser extent than directly at the support disks. In this instance, therefore, the pipe could theoretically expand. However, if the spacing of the support disks is limited along the longitudinal extent of the pipe, there is not sufficient space available for an expansion of the pipe.

Preferably, the expansion protection member has an inner diameter which is a maximum of 0.8 mm greater than the outer diameter of the pipe. There is consequently a play of a maximum of 0.4 mm around the pipe which is sufficient for the assembly of the expansion protection member on the pipe. However, an expansion of the pipe in order to overcome this play is not critical.

The expansion protection member preferably has an inner diameter which is a maximum of 10% greater than the outer diameter of the pipe. Consequently, the pipe can expand to a maximum of 10% of its outer diameter. Such an expansion is also non-critical since it still does not lead to bursting of or other damage to the pipe.

Preferably, the expansion protection member has a plurality of portions which are distributed over the length of the pipe. This facilitates the assembly. Furthermore, specific portions of the pipe may be formed without any expansion protection member if this is not required. This saves inter alia weight, which is particularly advantageous when used in a motor vehicle.

There is preferably arranged at least at one end of the pipe a line connector which has a connection piece which is inserted into the pipe, wherein the expansion protection member covers the connection piece at least over a portion of the length thereof. An expansion of the pipe is then also prevented in the region of the connection piece. Consequently, the risk of a leakage in this region is kept small.

In this instance, it is preferable for the expansion protection member to have in the region of the connection piece a smooth end region. In the region of the connection piece, the risk of a high vapor pressure forming is lower since there is generally no fluid present between the pipe and the connection piece. When the expansion protection member has a smooth end region here, the expansion protection member then takes up less construction space in the region of the line connector, which facilitates the handling.

In this instance, it is preferable for the expansion protection member to be connected to the line connector. Consequently, the position of the expansion protection member on the pipe can be precisely determined with a high level of reliability.

The invention is described below with reference to preferred embodiments together with the drawings, in which.

Figure 1:
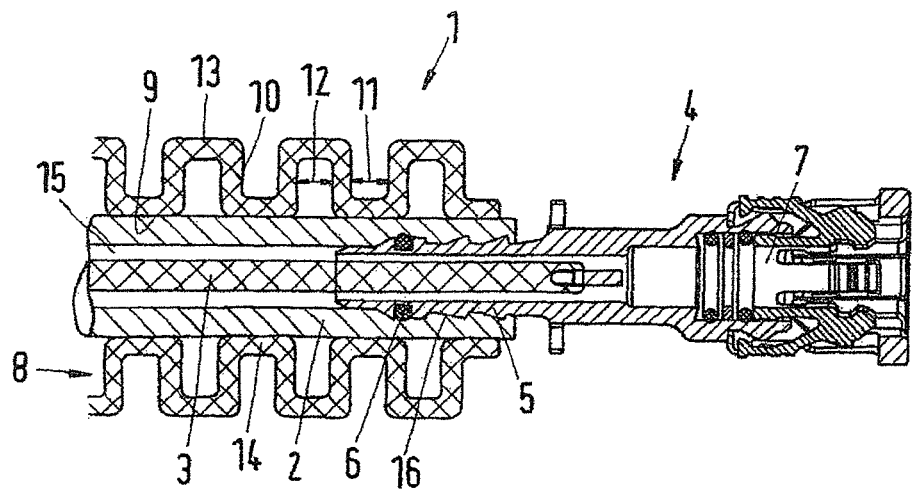
FIG. 1 shows a first embodiment of a fluid line.

FIG. 1 schematically illustrates a fluid line 1 with a pipe 2 which is formed by a plastics material. The plastics material can withstand a temperature of at least 150° C. A heating device in the form of a heating rod 3 is arranged in the pipe 2.

A line connector 4 is arranged at the end of the pipe 2 which is illustrated in FIG. 1. The line connector 4 has a connection piece 5 at one end. The pipe 2 is fitted to the connection piece 5. A seal 6 can be arranged between the connection piece 5 and the pipe 2. At the other end, the line connector 4 has a connection geometry 7.

The pipe 2 is surrounded by an expansion protection member 8. The expansion protection member 8 is in abutment with the inner periphery 9 thereof practically with the outer periphery of the pipe 2. In fact, there will in any case be a degree of play present when the expansion protection member 8 is assembled on the pipe 2 in order not to unnecessarily make the assembly harder. However, this play is relatively small. The fluid line 1 can thus be constructed in such a manner that, for example, the expansion protection member 8 has an inner diameter which is a maximum of 0.8 mm larger than the outer diameter of the pipe 2. Another or an additional dimensioning provision is that the inner diameter 9 of the expansion protection member 8 is a maximum of 10% greater than the outer diameter of the pipe 2.

The expansion protection member 8 has a series of support disks 10 which are arranged along the longitudinal extent of the pipe 2. There are provided between the support disks 10 spacings 11, 12 which each correspond to a maximum of the outer diameter of the pipe 2.

The support disks 10 are connected to each other parallel with the longitudinal extent of the pipe 2. To this end, in the present embodiment, radially outer connection walls 13 and radially inner connection walls 14 are provided. The radially outer connection walls 3 and the radially inner connection walls 14 alternate with each other. However, the expansion protection member 8 can also be constructed in such a manner that the connection walls 13, 14 are all arranged at the same radial positions. However, the embodiment illustrated in FIG. 1 has the advantage that the support disks 10 are better safeguarded against tilting.

The expansion protection member 8 also covers the connection piece 5 of the line connector 4 with two support disks 10.

The illustrated embodiment of the fluid line 1 may also be used in a region in which there is a high temperature. To this end, the plastics material of the pipe 2 is in the first instance relatively temperature-resistant, that is to say, it can withstand a temperature of 150° C. However, such a plastics material often becomes relatively soft when it is subjected to higher temperatures. This can lead to problems when a fluid which can be evaporated is arranged in the inner space 15 of the pipe 2, for example, a carbamide solution or urea. If this fluid is subjected to a temperature of more than 100° C., it evaporates at least partially and thereby produces in the inner space 15 an increased pressure, which may be considerably greater than 10 bar, for example, 14 or 15 bar. This high pressure would act on the softened plastics material from the radially inner side so that there is the risk of the pipe expanding. This can lead to bursting of the pipe 2.

The expansion protection member 8 ensures with the support disks 10 thereof that the expansion of the pipe can take place only in the context of the play required for the assembly. Already at relatively low pressures of 1, 2, 3, 4 or 5 bar, the pipe has expanded to such an extent that it is in abutment with the inner periphery 9 of the expansion protection member 8 and can no longer expand radially outward. This expansion is permissible. It is assumed that an expansion of a maximum of 10% will not yet lead to bursting of the pipe 2.

Since the support disks 10 are arranged with spacings 11, 12 with respect to each other, in these spacings 11, 12 there is the risk of the pipe 2 expanding at this location. However, this risk is negligible when the support disks 10 are arranged with spacings 11, 12 with respect to each other which correspond to a maximum of the outer diameter of the pipe 2. Preferably, the spacings 11, 12 correspond to a maximum of 50% of the outer diameter and in a particularly preferred embodiment a maximum of 40% of the outer diameter of the pipe 2.

The expansion protection member 8 additionally has the advantage that it forms a wind protection. This is, for example, advantageous when the fluid line 1 in a motor vehicle is arranged in the travel wind. In this instance, there is the risk of the fluid line freezing even at temperatures at which it would not yet freeze without any travel wind.

As a result of the fact that the expansion protection member 8 also engages over the connection piece 5, a radial expansion of the pipe is also prevented in this instance so that the pipe 2 can be securely retained on the connection piece 5. The connection piece 5 may, for example, have a pine-tree-like profile 16.

Figure 2:
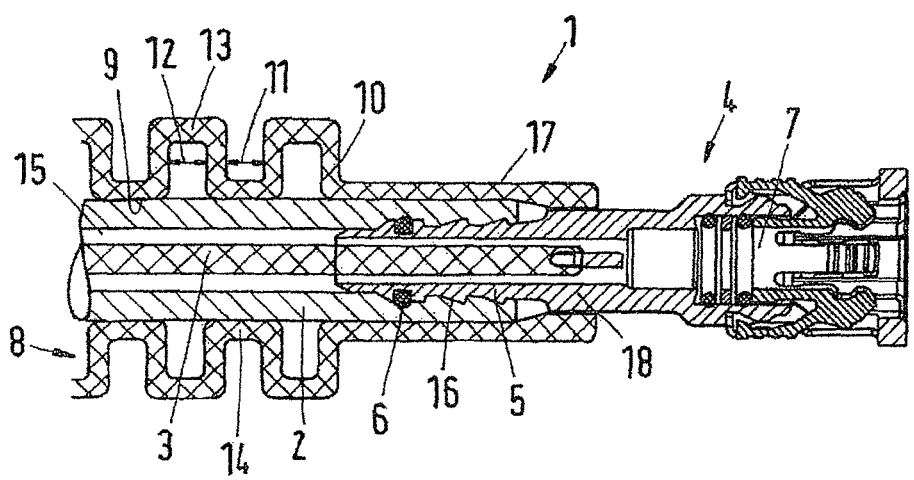
FIG. 2 shows a second embodiment of a fluid line.

FIG. 2 shows a modified embodiment of a fluid line 1. Identical and corresponding elements to those in FIG. 1 are given the same reference numerals.

In contrast to the embodiment according to FIG. 1, the expansion protection member 8 has a smooth end region 17 which surrounds the connection piece 5. The end region 17 is thus free from support disks 10.

The end region 17 is guided over the pipe 2 in the direction toward the line connector 4 and is connected to the line connector 4 at a housing portion 18. The connection may be carried out, for example, by means of ultrasonic welding or adhesive bonding. A defined position of the expansion protection member 8 relative to the line connector 4 and consequently also relative to the pipe 2 is thereby produced. This position is also not changed in the event of a deformation of the fluid line 1, for example, during assembly.

In a manner not illustrated in greater detail, it is possible to make provision for the expansion protection member 8 to be provided only over predetermined portions of the pipe 2. Other portions of the pipe 2 may remain free from an expansion protection member 8.

Even when the expansion protection member 8 extends continuously over the entire length of the pipe 2, the expansion protection member 8 may be formed with a plurality of portions which are distributed over the length of the pipe 2.

The material of the expansion protection member 8 may be selected exclusively with regard to the heat-resistance and the mechanical resistance and the expansion protection member 8 may also be sized exclusively with regard to these criteria. The expansion protection member may thus, for example, be formed from polyamide 6 which is resistant to high temperatures. Although polyamide 6 has a low expansion, it is so low that there is practically no risk of the pipe 2 bursting as a result of a high internal pressure.

The invention claimed is:

1. A fluid line comprising:
   a pipe of a plastics material,
   wherein the plastics material can withstand a temperature of at least 150° C., wherein an expansion protection member, at a time of assembly, is arranged to surround the pipe with a radial clearance as an empty space to provide a degree of play at least over a portion of the length of the pipe between an outer diameter of the pipe and an inner diameter of the expansion protection member, and wherein the pipe at a predetermined internal pressure, which is less than a predetermined limit pressure, is in abutment with the expansion protection member at a radially inner side.

2. The fluid line as claimed in claim 1, wherein the expansion protection member has a plurality of support disks which are orientated substantially perpendicularly to a radially outer surface of the pipe.

3. The fluid line as claimed in claim 2, wherein the support disks are connected to each other along a longitudinal extent of the pipe.

4. The fluid line as claimed in claim 2, wherein the support disks have in the longitudinal extent of the pipe a spacing with respect to each other which corresponds at a maximum to an outer diameter of the pipe.

5. The fluid line as claimed in claim 1, wherein the inner diameter of the expansion protection member has a maximum of 0.8 mm greater than an outer diameter of the pipe.

6. The fluid line as claimed in claim 1, wherein the inner diameter of the expansion protection member has maximum of 10% greater than an outer diameter of the pipe.

7. The fluid line as claimed in claim 1, wherein the expansion protection member has a plurality of portions which are distributed over the length of the pipe.

8. The fluid line as claimed in claim 1, wherein at least at one end of the pipe there is arranged a line connector which has a connection piece which is inserted into the pipe, wherein the expansion protection member covers the connection piece at least over a portion of the length thereof.

9. The fluid line as claimed in claim 8, wherein the expansion protection member has in the region of the connection piece a smooth end region.

10. The fluid line as claimed in claim 8, wherein the expansion protection member is connected to the line connector.

* * * * *